US010177974B2

United States Patent
Garcia et al.

(10) Patent No.: US 10,177,974 B2
(45) Date of Patent: Jan. 8, 2019

(54) CONFIGURING MANAGED SERVER

(71) Applicant: Hewlett Packard Enterprise Development LP, Houston, TX (US)

(72) Inventors: Jack Garcia, Houston, TX (US); Jorge Cisneros, Houston, TX (US); Lee Preimesberger, Houston, TX (US); Eric Ramirez, Houston, TX (US); Sangita Prajapati, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 127 days.

(21) Appl. No.: 15/324,288

(22) PCT Filed: Jul. 30, 2014

(86) PCT No.: PCT/US2014/048860
§ 371 (c)(1),
(2) Date: Jan. 6, 2017

(87) PCT Pub. No.: WO2016/018293
PCT Pub. Date: Feb. 4, 2016

(65) Prior Publication Data
US 2017/0201419 A1    Jul. 13, 2017

(51) Int. Cl.
*H04L 12/24* (2006.01)
*H04L 29/12* (2006.01)
*H04W 8/26* (2009.01)

(52) U.S. Cl.
CPC ...... *H04L 41/0806* (2013.01); *H04L 41/0896* (2013.01); *H04L 61/2015* (2013.01); *H04W 8/26* (2013.01)

(58) Field of Classification Search
CPC ............ H04L 41/0806; H04L 61/2015; H04L 41/0896; H04W 8/26
See application file for complete search history.

(56) References Cited

U.S. PATENT DOCUMENTS 7,831,997 B2   11/2010   Eldar et al.
8,041,794 B2   10/2011   Kohn et al.
(Continued)

FOREIGN PATENT DOCUMENTS

CN        103188091         7/2013

OTHER PUBLICATIONS

Fujitsu Software Server View Suite. Remote Management iRMC S2/S3—integrated Remote Management Controller. Jul. 2012, 426 Pgs.
(Continued)

*Primary Examiner* — Thai Nguyen
(74) *Attorney, Agent, or Firm* — Hewlett Packard Enterprise Patent Department

(57) ABSTRACT

An example managed server system (102) includes a managed server (104), a baseboard management controller (BMC) (108), and a shared memory (106). An example configuration process (200) includes transmitting (201), by the BMC, a network-address request over an out-of-band network; receiving (202) received configuration information; writing (203), by the BMC, stored configuration information to the shared memory; accessing (204), by the managed server, the shared memory to read the stored configuration information; and configuring (205) the managed server using the stored configuration information.

9 Claims, 6 Drawing Sheets

(56) References Cited

U.S. PATENT DOCUMENTS

| | | |
|---|---|---|
| 8,514,868 B2 | 8/2013 | Hill |
| 2006/0074927 A1 | 4/2006 | Sullivan |
| 2011/0035611 A1 | 2/2011 | Brey |
| 2011/0283006 A1 | 11/2011 | Ramamurthy |
| 2012/0233628 A1* | 9/2012 | Ling .................. G06F 9/54 719/328 |
| 2012/0317425 A1 | 12/2012 | Shao |
| 2012/0331119 A1* | 12/2012 | Bose .............. H04L 61/6004 709/223 |
| 2013/0091260 A1 | 4/2013 | Murphy |
| 2013/0152074 A1 | 6/2013 | Yeh |

OTHER PUBLICATIONS

International Searching Authority, The International Search Report and the Written Opinion, PCT/US2014/048860, dated Apr. 21, 2015, 9 Pgs.

\* cited by examiner

CONFIGURING MANAGED SERVER

BACKGROUND

Large scale computing environments, e.g., such as those providing cloud services, can include thousands of computers arranged in one or more data centers. Each of these computers must be configured to perform the functions intended for it.

BRIEF DESCRIPTION OF THE DRAWINGS

The following figures represent some examples of the claimed subject matter, which also encompasses other examples.

DETAILED DESCRIPTION

Some vendors of servers for enterprise computing systems, data centers, and cloud systems provide for automated centralized configurations of the servers they sell. However, customers for such servers may want to preserve the flexibility to expand using servers from a variety of vendors, and so may not want to be bound to a single vendor. An approach disclosed herein provides for fast, relatively convenient configuration of large numbers of computers even in a multi-vendor environment.

Figure 1:
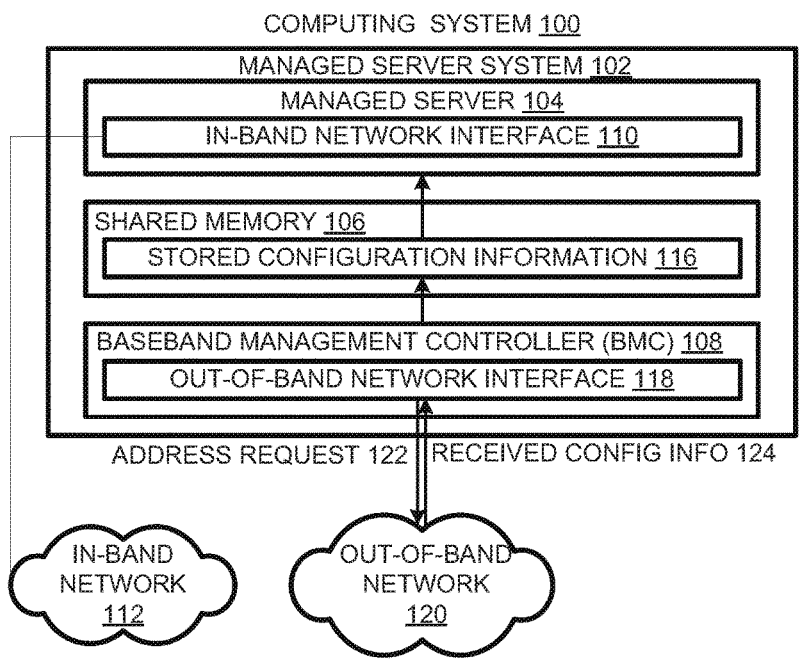
FIG. 1 is a schematic diagram of a managed computing system in accordance with examples.

As shown in FIG. 1, a computing system 100 includes a managed server system 102. Managed server system 102 includes a programmed-hardware managed server 104, shared memory 106, and a programmed-hardware baseboard management controller (BMC) 108. Managed server 104 includes an in-band network interface 110 for communicating over an in-band network 112. Managed server 104 is further programmed to read stored configuration information (config info) 116 from shared memory 106. Managed server 104 is further programmed to configure itself (managed server 104) based on stored configuration information 116.

A "Baseboard Management Controller" or "BMC" is a specialized service processor that monitors the physical state of a server or other hardware using sensors and communicates with a management system through an independent "out-of-band" connection. The BMC may be located on the motherboard or main circuit board of the server or other device to be monitored. The fact that a BMC is mounted on a motherboard of the managed server or otherwise connected or attached to the managed server does not prevent the BMC from being considered "separate".

Sensors of a BMC may measure internal physical variables such as temperature, humidity, power-supply voltage, fan speeds, communications parameters, and operating system (OS) functions. If any of these variables happens to stray outside specified, limits, an administrator may be notified. The administrator may then take corrective action by remote control. The monitored device can be power cycled or rebooted as necessary. In this way, a single administrator can remotely manage numerous servers and other devices simultaneously, saving on the overall operating cost of the network and helping to ensure its reliability.

BMC 108 includes an out-of-band network interface 118 for communicating over an out-of-band network 120. For example, BMC 108 can transmit a network-address request 122 over out-of-band network 120, and can receive, over out-of-band network 120, configuration information 124 in response to the network-address request. BMC 108 is further programmed to write received configuration information 124 to shared memory 106, from which it can be read by managed server 104.

Figure 2:
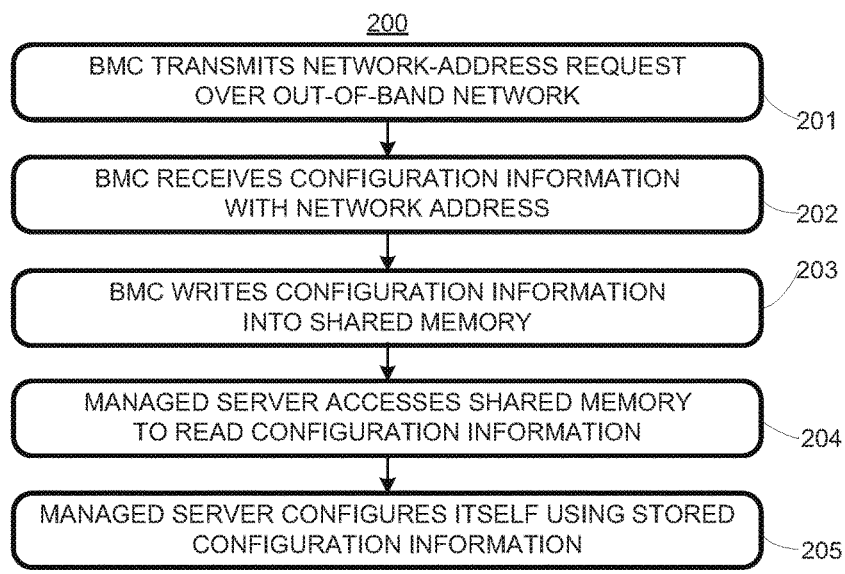
FIG. 2 is a flowchart of a configuration process implementable in the managed computing system of FIG. 1 in accordance with examples.

A process 200, implementable in computing system 100 and in other systems, is flow-charted in FIG. 2. At 201, a BMC transmits a network-address request for a network address over an out-of-band network. At 202, the BMC receives, in response to the network-address request, received configuration information. At 203, the BMC writes stored configuration information, based on the received configuration information, to a shared (between the BMC and a managed server) memory. At 204, the managed server accesses the shared memory to read the stored configuration information. At 205, the managed server configures itself based on the stored configuration information.

In some scenarios, computing system 100 and process 200 allow a custom configuration to be applied automatically to a server just by turning on a hosted BMC. New devices are typically configured to request network addresses upon start up, so no extra steps are required to obtain the configuration information. In cases where a BMC is programmed to automatically start the host server once the BMC boot-up is complete, an administrator can implement a custom configuration simply by providing auxiliary power to the BMC.

An administrator can specify a configuration to be applied to a managed server by programming a network-address server to respond to network-address requests with suitable configuration information. Network-address protocols, such as the Dynamic Host Configuration Protocol (DHCP) and the Bootstrap Protocol (BootP), provide for responding to network-address requests with information (in addition to network addresses) to be used in accessing the network over which the request and network address were communicated. The requests and received configuration information can be sent using a User Datagram Protocol (UDP), which is employed by both BootP and DHCP.

In other words, the entity (server) making the network-address request is the same entity) that is to be configured based on the returned configuration information. As a result, the configuration information is not available when configuration begins; rather, boot-up and configuration must have proceeded far enough for a network address to be requested. While the configuration information may be obtained in time for configuring network access, the configuration information may be obtained too late for certain other parameters to be set.

In contrast, in computing system 100 and process 200, the entity (BMC) making the network-address request is separate from the entity (managed server) to be configured. This means that the configuration data is available to the host managed server when the host managed server is powered ON. Thus, the configuration information can be applied to configuration parameters that might have to be set before the host server can request a network address. For example, process 200 can be used when switching the network controller modes. Many newer network-interface cards (NICs) can change from Internet Small Computer Systems Interface/Fiber Channel Over Ethernet (iSCSI/FCoE) to normal Ethernet. Process 200 can be used to set the "personality" of NICs before powering ON and booting the system operating system.

Address-assignment protocols typically limit the amount of data that can be provided in response to a network-address request. For example, a DHCP datagram can have a capacity limited to a fixed number of bytes, e.g., 512 bytes. In many cases, the amount of data desired to configure a managed server may exceed the capacity provided by the network-address protocol. In such cases, the configuration information provided in response to a network-address request can be or include a pointer to further configuration information. The pointer can be, for example, a Uniform Resource Locator (URL) identifying a network location from which further configuration information can be obtained.

The URL or other pointer can identify a network location that can be: accessed over the out-of-band network by the BMC; or accessed over the in-band network by the managed server. "Out-of-band" and "in-band" approaches can be combined: for example, in response to a network address request, the BMC can receive an out-of-band URL. The BMC can access the location specified by the out-of-band URL over the out-of-band network to obtain "out-of-band" configuration information. The out-of-band configuration information can specify an "in-band" URL, which the BMC writes to shared memory. The managed server reads the "in-band" URL and obtains "in-band" configuration information from the location identified by the "in-band" URL. The managed server can then configure itself based at least in part on the in-band configuration information.

Figure 3:
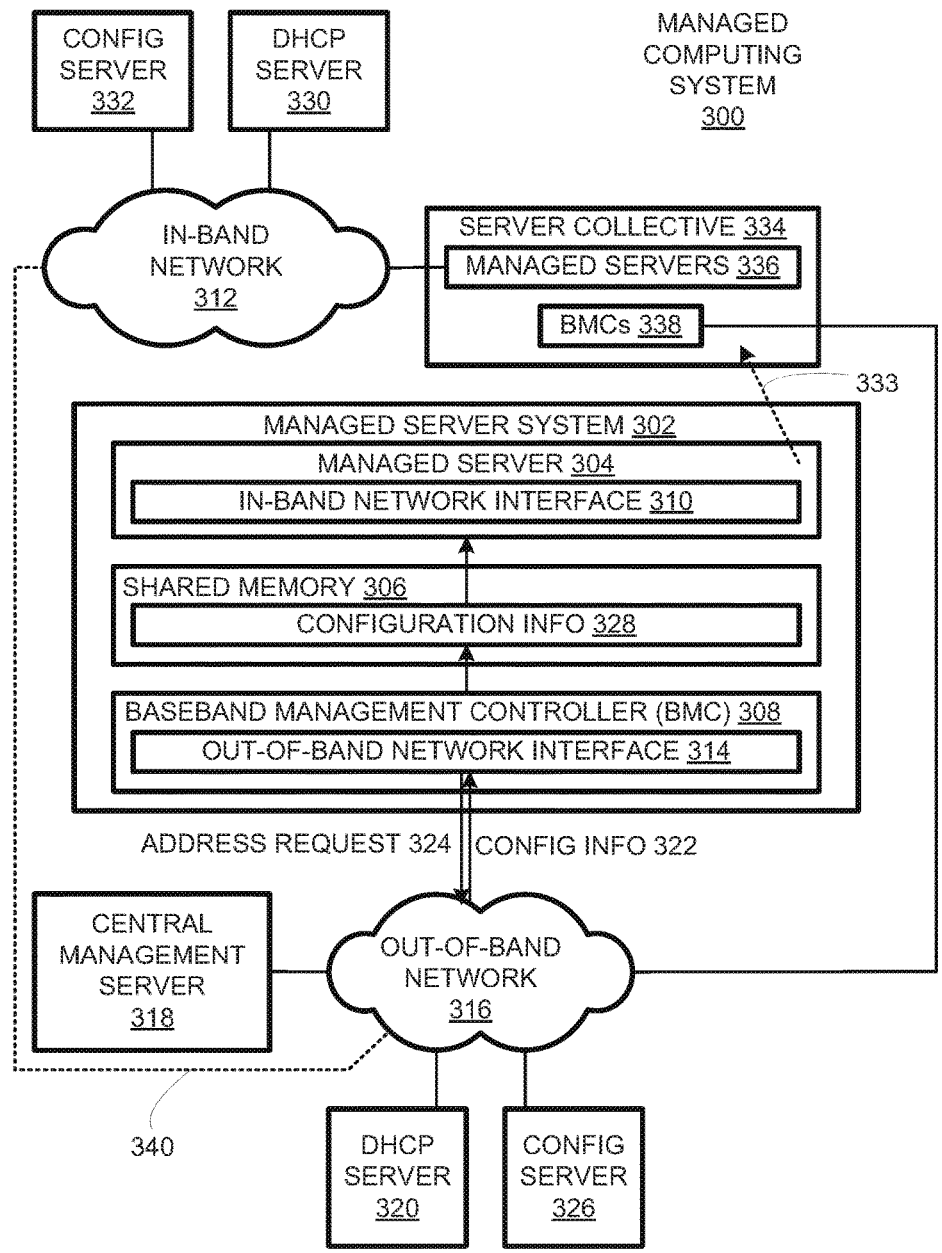
FIG. 3 is a schematic diagram of another managed computing system in accordance with examples.

Computing system 300, shown in FIG. 3 for example, includes a managed server system 302 including a physical managed server 304, shared memory 306, and a BMC 308. Note that, while in sonic variants, a BMC may be located on the motherboard of a host managed server, the BMC is functionally separate from the respective host managed server, at least insofar as the BMC can operate while the host manager server is powered down (OFF).

Managed server 304 includes an in-band network interface 310 for communicating over an in-band network 312. BMC 308 includes an out-of-band network interface 314 for communicating via an out-of-band network 316. An administrator using a central-management server (CMS) 318 can manage server 304 via out-of-band network 316. An administrator, either through a local connection or via CMS 318 can configure or otherwise program a DHCP (address-assignment) server 320 to provide "received" configuration information 322 along with a network address in response to a network-address request 324 from BMC 308.

The DHCP protocol employs a connectionless service model, using UDP. DHCP operations fall into four "DORA" phases: server discovery (i.e., an IP lease request), IP lease offer, IP request, and IP lease acknowledgment. The server discovery stage involves a client (in this case, a managed server) broadcasting a request for an Internet-Protocol (IP) address. The IP lease offer stage involves the DHCP server proposing an IP address to the client. The IP request stage can involve the client requesting the offered address. The IP lease acknowledgement stage involves the DHCP server sending a DHCP acknowledgement to the client. The DHCP packet confirms the network address assigned to the client and may include additional information. In the present example, that additional information includes "received" configuration information (config info) to configure managed server 304 (which did not request the IP address) rather than BMC 308 (which did request the IP address). The DHCP IP discovery, offer, request, and acknowledgements messages are sent over UDP.

In some cases, the received configuration information provided by DHCP server 320 is simply written, unconverted, to shared memory 306, where it serves as stored configuration information 328. In other cases, BMC 308 may act upon the received configuration information so that the configuration information it stores in shared memory 306 is derived from, but differs from, the received configuration information.

For example, the amount of configuration information required can exceed the available capacity for such information in a DHCP acknowledgement packet. For such cases, the received configuration information can be or include a pointer to further configuration information. For example, configuration information 322 can include a Uniform Resource Locator (URL) identifying an in-band or an out-of-band network location of a configuration information server. In either case, the network location may be associated with a configuration server that can store as much configuration information as desired without regard to the limitations of DHCP messages.

The URL may identify an "out-of-band" configuration server 326. In such a case, BMC 308 can 1) retrieve "out-of-band" configuration information; derive "stored" configuration information from the out-of-band configuration information; and 3) store the stored configuration information in shared memory 306. Further, for greater flexibility, the data on configuration information server 326 can point to other configuration data. Alternatively, the URL provided by DHCP server 320 can specify an in-band network location. In such a case. BMC stores the in-band URI in shared memory 306 as part of the stored configuration information.

Once configuration information 328 is stored in shared memory 306, managed server 304 can be booted or rebooted. During boot-up, managed server 304 reads stored configuration information 328 from shared memory 306, and configures itself (managed server 304) accordingly. More specifically, a processor of managed server 304 executes a configuration program that causes the processor to configure managed server 304 in accordance with the instructions of the configuration program, which in turn causes managed server 304 to be configured in accordance with the stored configuration information.

The configuration program can be stored in non-volatile memory as part of the platform firmware. In this case, "platform" used to identify a class of servers or other computers. For example, all computers from the same vendor that share a model number can constitute a "platform". Alternatively, computers having the same hardware and operating system can constitute a "platform". The configuration program may be a boot or pre-boot program that terminates when booting is complete, or may be a service operating system that continues to run even as the main operating system executes. Examples of main operating systems include Windows and Unix derivatives, as well as hypervisors and other virtualizing operating systems.

The boot-up process can include requesting, by managed server 304 according to the instructions of the configuration program, a network address. The request 324 can be made over band network 312 using in-band network interface 310. The in-band request can be handled by a DHCP server 330 on in-band network 312. DHCP server 330 can supply additional "in-band" configuration information, tiding a URL, in its acknowledgement packet.

In an alternative example, a DHCP server handles network-address requests over an out-of-band network and over an in-band network. Since the out-of-band network is separate from the in-band network, a DHCP relay can be used to permit the DHCP server to communicate across networks to either managed servers, BMCs, or both.

Stored configuration information 328 may include an in-band URL identifying a location of a configuration server 332 on in-band network 312. In that case, once a connection is established to in-band network 312, managed server 304 can access further configuration information on configuration server 332.

Note that, as indicated by dashed line 340, in-band network 312 and out-of-band network 316 may be connected. In one example, a single DHCP server can provide network addresses over both networks and a single configuration server can provide configuration information over both networks.

One use for configuration information 328 is to configure managed server 304 to join a server collective. Dashed arrow 333 represents managed server 304 joining server collective 334. Herein, a "server collective" is a set of servers configured to serve a common purpose. Server collective 334 includes plural managed servers 336, each hosting a respective BMC 338. In some examples, the number of managed servers may number in the thousands. Managed servers 336 communicate with each other over in-band networks. BMCs 338 communicate with central management server 318 via out-of-band network 316.

Examples of server collectives can include cloud services systems, data centers, and enterprise computing systems. While it is possible for all servers in a collective to share a common structure and function, in general, a server collective includes servers with diverse roles, hardware specifications, and programming. Accordingly, there may be many possible configurations to implement on a server collective.

DHCP discovery requests include information regarding hardware addresses of the requester. This information can be used to identify a server by manufacturer (vendor), model number, and serial number. Since the identity of a BMC is uniquely associated with its host managed server, there is, at least in principle, sufficient information in a BMC address assignment request for a DHCP server to provide configuration information customized for the respective host managed server. Accordingly, an administrator can program configuration information server 326 to supply configuration information as a function of vendor, model number, and serial number, etc.

One way to identify which files are associated with which managed servers is to encode identification information into the file names. Typical file names often include a main part and a file name extension separated by a period. For example, all configuration information for servers from vendor A can be in files with the file.name extension "vendora", (e.g., such as "file1.vendora") while configuration information for servers from vendor B can be in files with the extension "vendora", etc. Similarly, filename extension differentiators can be used for different groupings of servers.

Also, since the vendor, model number, and serial number of a BMC or a server uniquely identify a server, other criteria for selecting configuration information can be based on server specifications obtained from a server database. In another example, configuration information sent in response to a network-address request can be generated algorithmically based on demand. In some examples, demand is tracked by a workload management system.

Figure 4:
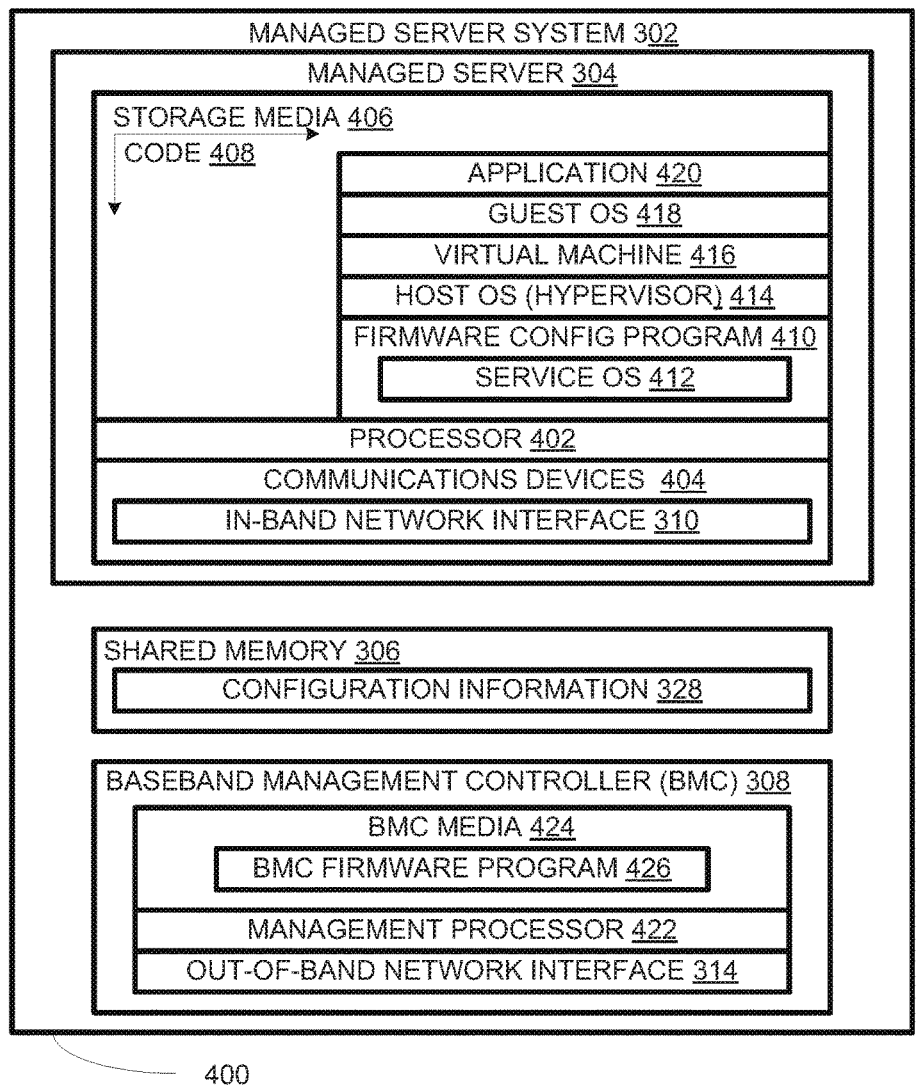
FIG. 4 is a schematic diagram of a managed server of the managed computing system of FIG. 3 in accordance with examples.

Managed server system 302, shown in greater detail in FIG. 4, has an enclosure 400 that encloses managed server 304, shared memory 306, and BMC 308. Hardware of managed server 304 includes a processor 402, communication devices 404, including in-band network interface 310, and storage media 406. Storage media 406 is physically encoded with code 408; code 408 defines the functionality of managed server 304 via computer programs including a firmware configuration program 410 that includes a service operating system (OS) 412, a host OS or hypervisor 414, and virtual machines 416, each with a guest OS 418 and an application 420. Service OS 412 is the entity that reads stored configuration information 328 from shared memory 306. Application 420 basically defines the mission of managed server 304 from a user perspective. Example applications include web servers, database programs, and accounting programs. Hardware of BMC 308 includes a management processor 422, BMC storage media 424, and out-of-band network interface 314. BMC storage media 424 is encoded with a BMC firmware program 426 that defines the functionality of BMC 308.

Alternative managed server systems may include plural physical partitions either sharing BMCs or each with its own BMC. Each physical partition or server can have processors, network interfaces including host-bus adapters (HBAs) for communicating over storage-array networks (SANs), and various combinations of types of media including volatile memory, non-volatile memory, solid-state memory, disk-based memory, etc. A physical server or partition may support zero, one, or more virtual machines, each of which may support a guest operating system and applications.

Figure 5:
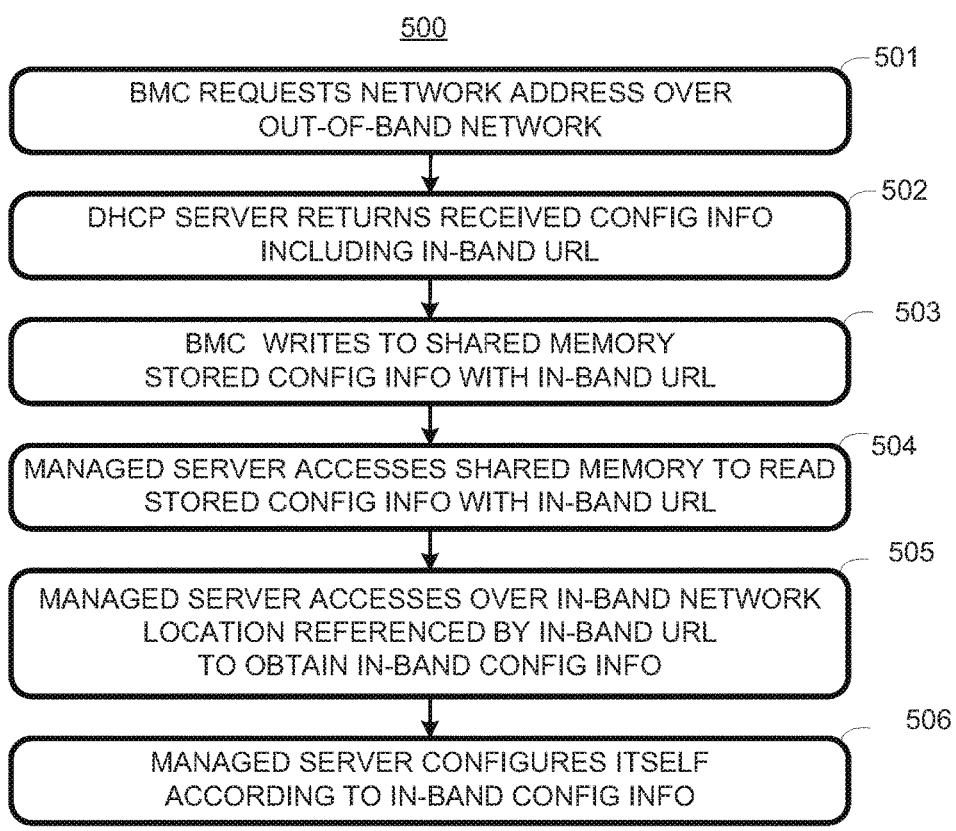
FIG. 5 is a flow chart of a configuration process implementable in the managed computing system of FIG. 3 in accordance with examples.

A process 500 implementable on computing system 300 and on other computing systems is flow charted in FIG. 5. At 501, a BMC requests a network address over an out-of-band network. At 502, a DHCP server returns configuration info including the requested network address and an in-band URL (i.e., a URL identifying a network location that can be accessed by the respective managed server over an in-band network).

At 503, the BMC writes configuration information to shared memory shared with the respective managed server. The configuration written may be identical to the configuration information received from the DHCP server, the stored configuration information may be a modified version of the received configuration information, or the stored configuration information may have been derived from the received configuration information in some other way. Herein, the configuration information as received from the DHCP server is referred to as the "received configuration information", while the configuration information as written to shared memory is referred to as the "stored" configuration information. In the example of FIG. 5, the stored configuration information includes the in-band URL provided with the received configuration information.

At 504, the managed server accesses shared memory to read the stored configuration information including the in-band URL. At 505, the managed server accesses, over the in-band network, the location/device referenced by the in-band URL to obtain "in-band" configuration information. At 506, the managed server configures itself using the in-band configuration information. Since the in-band configuration information is derived from the stored configuration information, and since the stored configuration information is derived from the received configuration information, it can also be said that the managed server configures itself using the received configuration information and the stored configuration information.

In the process of FIG. 5, the received configuration information specified a URL for "in-band" configuration information accessed and used by the managed server to configure itself. More complex sequences are possible in which one URL specifies another URL, as in the following example.

Figure 6:
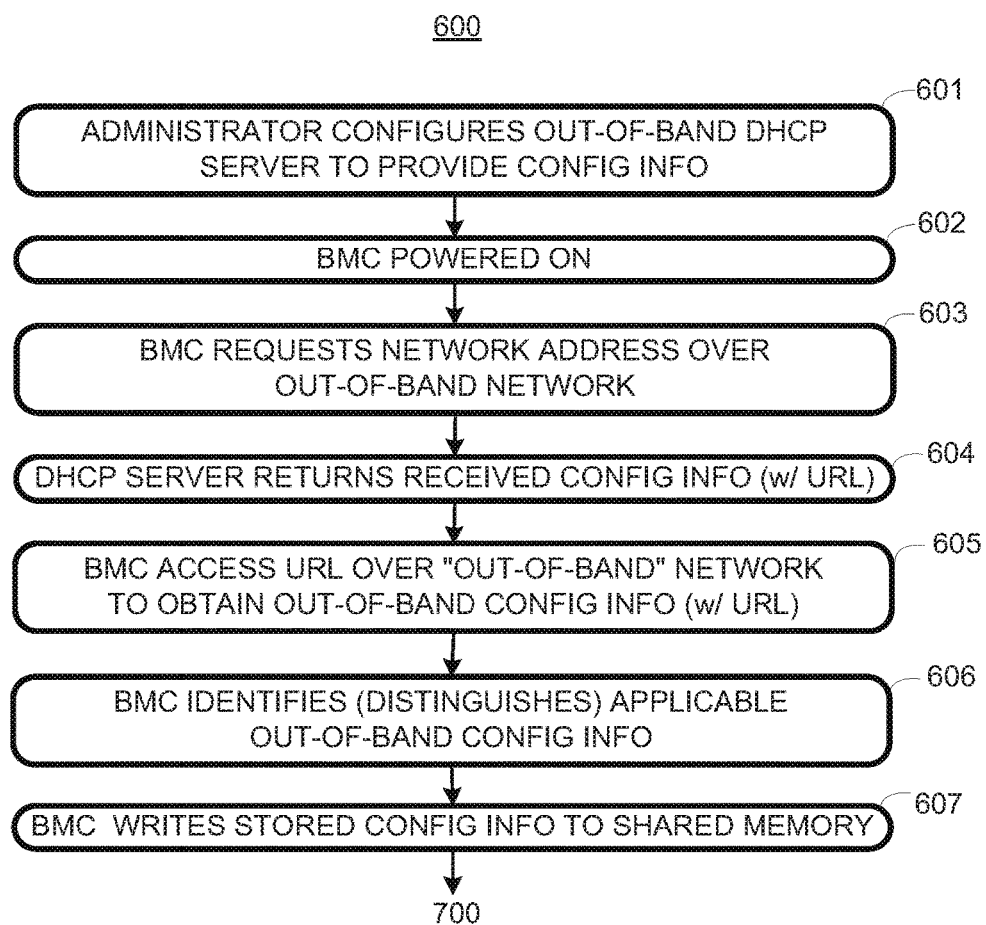
FIG. 6 is a flow chart of a first phase of another configuration process implementable in the managed computing system of FIG. 3 and in other systems in accordance with examples.
Figure 7:
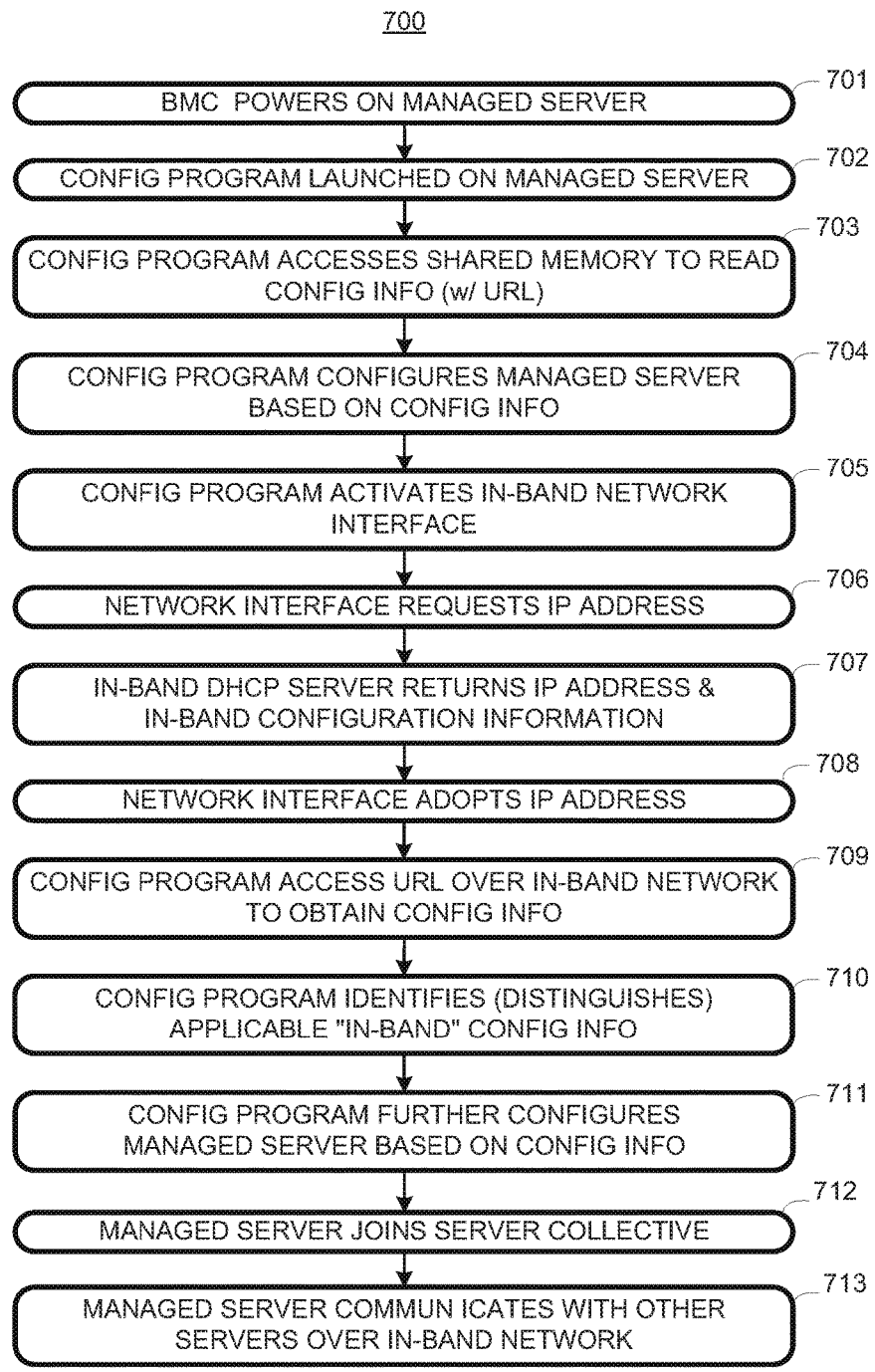
FIG. 7 is a flow chart of a second phase of the configuration process of FIG. 6 in accordance with examples.

A process 600 implementable on computing system 300 and on other computing systems is flow charted in FIGS. 6 and 7. In a first phase of process 600, at 601, an administrator programs or otherwise configures an "out-of-band" (in that it is to be accessed via an out-of-band network) DHCP server to provide "received" configuration information in response to a network-address request. This providing can entail storing, on the configuration server, configuration information eventually to be stored in shared memory.

Alternatively or in addition, the DHCP can be programmed for identifying or generating configuration information based on information in an address-assignment request. As a result, DHCP server 320 may provide the same information regardless of the BMC requesting a network-address or may provide configuration information (in addition to a network address) that is specific to a particular vendor, platform, group of servers, or an individual server.

The configuration information to be provided by the DHCP server can include configuration information to be stored "as is" in shared memory for use by the host managed server in configuring itself. Instead or in addition, the configuration information to be provided by the DHCP server can include information that a BMC can use to determine the configuration information to be written to shared memory for use by the host managed server. In the latter case, the configuration may include an "out-of-band" URL for a configuration server accessible via an out-of-band network, or an "in-band" URL for a configuration server accessible via an in-band network, or URLs for both in-band and out-of-band network locations.

At 602, a BMC is powered ON. For example, when a managed server system is powered on, the BMC may be automatically powered on while the associated managed server remains powered OFF (initially). At 603, the BMC, as part of its boot routine, requests a network address over an out-of-band network. At 604, an out-of-band DHCP server or other address-assignment server on or in communication with the out-of-band network returns an IP network address and other configuration information to the BMC. The BMC can adopt the out-of-band IP address returned in response to the network-address request. Also, at 604, the BMC receives the "received" configuration information from the out-of-band DHCP server.

Depending on the programming at 601, the received configuration information may or may not include an "out-of-band" URI identifying a location of a configuration server on the out-of-band network. If an out-of-band URL is included, at 605, the BMC may access (over the out-of-band network) additional "out-of-band" configuration information from a configuration server identified by the out-of-band URL.

At 606, the BMC identifies applicable out-of-band configuration information. The configuration information stored on a configuration server may include configuration information that is applicable to some managed server, but not the managed server hosting the BMC. In such a case, the BMC may be configured to obtain or store, in shared memory only, configuration information applicable to the host managed server. To this end, the BMC may distinguish applicable configuration information from inapplicable configuration information. One way to distinguish files is by file-name extension (as described further below).

At 607, the BMC writes "stored" configuration information to the shared memory (shared with a managed server). The stored configuration information is based at least in part on the "received" configuration information received from the out-of-band DHCP server. In addition, at least some stored configuration data may be based on the out-of-band configuration information (which, in turn, is based on the received configuration information). In this case, the stored configuration may be based indirectly on the received configuration information. This completes the first phase of process 600.

The second phase 700 of process 600 is flow-charted in FIG. 7. At 701, the BMC automatically powers ON the managed server once configuration information is stored in shared memory. In an alternative example, an administrator sends a command over the out-of-band network for the BMC to power ON the managed server.

At 702, a configuration program of the managed server is launched. At 703, the configuration program, which can include a service operating system, accesses the shared memory and reads the configuration information written by the BMC. At 704, the configuration program at least partially configures the managed server (in other words, the managed server configures itself) based on the stored configuration information.

At 705, the configuration program activates an in-band network interface. At 706, the newly activated in-band network interface requests an IP address over the in-band network. At 707, an "in-band" DHCP server (i.e., a DHCP server accessible by the managed server over the in-band network, provides an in-band network address to the network interface, as well as further configuration information). Depending on the scenario, this further configuration information may or may not include another in-band URL. At 708, the network interface adopts the IP address provided by the in-band DHCP server.

If the configuration information obtained from the in-band DHCP server includes a URL, then, at 709, the configuration program accesses a configuration server at the in-band URL to obtain further configuration information. A configuration server at the location identified by the in-band URL may store configuration information that is applicable to some managed servers, but not to the managed server hosting the configuration program. At 710, the configuration program identifies applicable configuration information at the in-band location. This can involve distinguishing applicable from inapplicable configuration information, by comparing file-name extensions, as described further below. At 711, the configuration program further configures the managed server using the configuration information obtained from the in-band DHCP server.

As a result of the configuration activities, the managed server may have been configured to join a server collective.

At 712, which may follow 708 or 710, the managed server joins a server collective. At 713, the managed server communicates using the in-band network, with other servers, including other managed servers of the collective. In alternative examples, sonic of the actions of process 600 are omitted, rearranged, or supplemented with other actions. In a variation, process 600 is used to load an operating system for standalone use.

Processes 500 and 600 conform to the Intelligent Platform Management Interface (IPMI) that is supported by many server vendors. IPMI is a standardized computer system interface used by system administrators for out-of-band (i.e., "lights-out") monitoring and management of computer systems. Therefore, processes 500 and 600 can be used to manage server collectives that include servers from multiple vendors. Examples of IPMI implementations include Integrated Lights-Out (iLo) available from Hewlett-Packard Company, Integrated Dell Remote Access Controller (iDRAC), available from Dell Corporation, Remote Supervisor Adapter (RSA) available from IBM, MegaRAC available from American Megatrends, and Mergepoint Embedded Management Software available from Avocent.

In alternative embodiments, another platform management specification is implemented. Examples of alternative platform managements specifications include: Active Management Technology (AMT) available from Intel Corporation, Distributed Management Task Force (DMTF), DMTF Desktop and mobile Architecture for System Hardware (DASH), DMTF Alert Standard Format (ASF), Wired for Management (WfM), and System Service Processor (Sun Microsystems).

Processes 500 and 600 thus provide automatic and intelligent configuration and provisioning of servers both in single-vendor and in multi-vendor computer collectives without using Intel's Preboot eXecution Environment (PXE) or a scripted configuration. Provided functionality can include OpenStack (an open source cloud computing solution) membership, Microsoft Cloud membership, disk configuration, BIOS settings, OS installation and scripting, BMC configuration, including memberships in groups such as Federated iLo, and automatic firmware updates to a site baseline.

Processes 500 and 600 can include install data in the out-of-band network-address assignment (DHCP or BootP) data that is distributed on the out-of-band network. In an OpenStack environment, netmasq is used in most cases. In a Hewlett-Packard environment, dhcpd is generally used. All of these variations allow the addition of vendor defined tags, which are generally used for network specific configuration. Processes 500 and 600 defines vendor tags for the automatic configuration of the system using the BMC. The BMC reads these options set forth in the configuration information on boot and automatically launches an embedded service OS on the system to begin deployment.

For admission to a computing cloud, such as OpenStack, the tag openstack-connect-string may be defined as "200" and contains all needed info to connect to and register with a bare metal cloud solution, such as OpenStack Ironic. For a more complex set up, the vendor tag "201" may be added. Vendor tag "201" then contains the URL of a publicly-readable system that contains structured vendor configurations files. These vendor files are grouped by the defined extension .hp for Hewlett-Packard Company Deployment Profile, which allows a rich set of configuration options to the newly booted server, including installation of operating systems, hardware and BMC configuration, and more complex cloud membership options. This can also be used to automatically join a system to a traditional deployment system such as Hewlett-Packard Company One View.

The URL referenced by configuration program 410 has a defined file structure. Each vendor scans this data based on extension so, for instance, a service operating system for Hewlett-Packard Company server would read all files ending with ".hp". Vendor A would then look for files called ".vendora". The files are structured by specificity. The provisioning engine will choose from configuration files based on this hierarchy. For example, for Hewlett-Packard Company servers, the hierarchy would include the following.

System Serial Number per SMBIOS (0000HSA21222.hp)
Model Name per SMBIOS information (d1380gen8.hp)
A Default File (default.hp)

Advantages of system 300 and processes 500 and 600 include: expensive manual configuration is bypassed; systems are configured more reliably and precisely without manual intervention; scripting and vendor-specific management systems are not needed for deployments into high-performance computing environments; and systems can start doing useful work as soon as they complete Power-On Self-Test (POST).

Herein, a "system" is a set of interacting non-transitory tangible elements, wherein the elements can be, by way of example and not of limitation, mechanical components, electrical elements, atoms, physical encodings of instructions, and process actions. Herein, "process" refers to a sequence of actions resulting in or including a physical transformation.

Herein, "machine" refers to a hardware system. A "virtual machine" is not a machine, but is a real program (defined by software encoded on non-transitory physical media) that interacts with some entity. For example, a virtual machine would appear to an operating system executing on the virtual machine as though it were a (physical) machine. Herein, "computer" refers to a programmable hardware machine for manipulating physically encoded data in accordance with physically encoded instructions. All computers include hardware; more specifically, all computers include at least a processor, communications devices, and storage media that is encoded with code or is encodable with code defining data and instructions.

Depending on context, reference to a computer or server may or may not include code encoded on media of the computer. All acts performed by instructions executing on a server, or other computer server, are attributable to the server/computer itself.

The instructions are typically arranged in "programs" that determine the functionality of the computer. Application programs are designed to serve a primary mission of a server. Operating-system programs, aka "operating systems" or "OSs", are typically provided as an interface between application programs and computer hardware.

Herein, a "server" is a computer or virtual machine that performs services for other computers. A "physical server" is a computer and thus a machine; inherently, a physical server includes a processor, a communications device, and media for storing code. A "virtual server" is a program that appears to a (guest) operating system executing on the virtual server as if it were a physical server. In other words, a "virtual server" is a virtual machine that provides services to other physical or virtual servers.

Herein, a "managed server" is a server managed using another computer such as a central management server. "Manage", herein, means "monitor and configure". "Monitor" means "keep track of the values of operational parameters". For example, monitoring can include periodically or continuously measuring processor utilization and/or response time associated with a managed server.

"Configuration" refers to the components of a server or other entity along with the arrangements and settings of those components. "Configure" means "implement a configuration". "Configuration information" encompasses instructions and data for implementing a configuration. "Applicable" and "inapplicable" are dichotomous terms to be interpreted relative to a given managed server. Configuration information to be used in configuring a managed server is said to be "applicable" to that server. Configuration information to be used in configuring servers other than a subject managed server are "inapplicable" to the subject server.

Applicable and inapplicable configuration information can be found over an in-band network, in which case they are respectively, "applicable in-band configuration information" and "inapplicable in-band configuration information". Applicable and inapplicable configuration information can be found over an out-of-band network, in which case they are respectively, "applicable out-of-band configuration information" and "inapplicable out-of-band configuration information".

Herein, a "computing collective" is a set of servers and other computer-related objects collectively configured for some joint task or service. Examples of computing collectives include hardware systems serving as data centers and hardware systems serving as back-ends for cloud services.

Herein, "processor" refers to hardware for executing instructions. A processor can be a monolithic device such as an integrated circuit, a portion of a device, such as a core of a multi-core integrated circuit, or a distributed or co-located set of devices. Herein, "communications devices" refers to physical (i.e., including hardware) devices used for communication, including both network devices and human interface devices. Herein, "storage medium", "storage media", and "memory" refer to systems including non-transitory tangible material in or on which information is or can be encoded with code representing data and/or instructions.

Herein, "controller" refers to a physical device that controls sonic object. "Controller" encompasses hardware-only devices, hardware devices that can be configured or programmed, and hardware devices that manipulate data in accordance with instructions.

Herein, a "Baseboard Management Controller (BMC)" is a device that monitors and controls a physical server based on information and commands received from a management server. The controller provides a remote administrator the ability to power the physical server ON and OFF.

Herein, "shared memory" refers to media that is addressable by more than one entity. The shared memory may be physically located in the BMC, in the physical server, or in both the BMC and the host server; alternatively, the shared memory may be separate from both the BMC and the host server. In the present context, the shared memory is addressable by a BMC and a physical server that hosts the BMC. Collectively, the combination of a BMC, its host physical server, and their shared memory is referred to as a "server system" or a "managed server system".

Herein, stored configuration information, written to and stored in shared memory, is "derived" from received configuration information. Herein, "derived" encompasses each of the following: 1) the stored configuration information may be an exact copy of the received configuration information; 2) the stored configuration information may be obtained by modifying or manipulating the received configuration information in some way; and 3) the stored configuration information may be obtained from a source identified by a pointer in the received configuration information. In addition, "derived" encompasses combinations and sequences of the foregoing examples.

Herein, a "network" is an interconnected group of communications channels over which computers can communicate with other computers and other devices. Depending on context, the network can be considered as including the computers that communicate over the network or as being an entity separate from the computers that communicate using the network.

Herein, a "network address" an identifier for a device on a network; the device identified by a network address may be referred to as a "location". Examples of network addresses include Internet Protocol (IP) addresses, Uniform Resource Locators (URLs), and Media Access Control (MAC) addresses. A "network-address request" is a request to be assigned a network address. For example, the DHCP discovery and request messages can be considered network-address assignment requests. Herein, a "pointer" is an identifier of a location. The location can be a network location or a memory location. Thus, network addresses and memory addresses are pointers.

Herein, "in-band" and "out-of-band" are labels for dichotomously classifying networks and related components. An "in-band network" is a network over which servers normally communicate with computers to which the servers are providing services. An "out-of-band network" is a network, other than an in-band network, used for managing a server. For the purposes herein, networks connected to a managed server (as opposed to a BMC) are in-band, while networks connected to BMCs are out-of-band.

Herein, an "in-band network location" is a network location accessible via an in-band network. An "in-band network address" is a network address of a device accessible on an in-band network. An "out-of-band network location" is a network location accessible via an out-of-band network location. A network location can be both "in-band" and "out-of-band", for example, if the networks are connected. When used to qualify terms other than "network", "in-band" and "out-of-band" are used as non-limiting labels. For example, "in-band" configuration information is configuration information that happens to be accessed via an in-band network, while "out-of-band configuration information" is configuration information that happens to be accessed via an out-of-band network.

"Directly connected" means connected without an intervening network or device other than a device that serves primarily as an interface. Thus, the BMCs disclosed herein are directly connected to out-of-band networks but not to in-band networks, while managed servers are directly connected to in-band networks but not to out-of-band networks. Herein, two networks are "separate" if communications occur on each of the networks without occurring on the other.

Herein, a "network address" identifies a network location of a network object, including physical network objects such as physical computers and BMCs, and including program network objects, such as virtual-machine servers. "Network address" encompasses URLs and IP addresses.

Herein, "configuration" refers to the elements and the arrangement of the elements of a system. "Configuration" can refer to a complete description of the elements and their arrangements, or aspects of the elements or arrangements. Herein, "configuration information" may describe an existing configuration or specify a configuration to be implemented. Herein, "configuring" describes an act of implementing a configuration. Herein, a "configuration program" is a series of instructions for configuring a server.

In this specification, related art is discussed for expository purposes. Related art labeled "prior art", if any, is admitted prior art. Related art not labeled "prior art" is not admitted prior art. In the claims, "the" introduces elements for which there is either explicit verbatim antecedent basis or implicit antecedent basis. "Comprising", which is used synonymously with "including", is used exclusively to demark the transition between a claim preamble and the body of the claim. The illustrated and other described embodiments, as well as modifications thereto and variations thereupon, are within the scope of the following claims.

What is claimed is:

1. A configuration process comprising:
   transmitting, by a baseboard management controller (BMC), a network-address request over an out-of-band network to which the BMC is directly connected;
   receiving, by the BMC in response to the network-address request, received configuration information;
   writing, by the BMC to shared memory shared with a managed server, stored configuration information derived from the received configuration information, the managed server being separate from the BMC;
   accessing, by the managed server, the shared memory to read the stored configuration information; and
   configuring, by the managed server using the stored configuration information, the managed server to communicate over an in-band network to which the managed server is directly connected and which is separate from the out-of-band network,
   wherein the stored configuration information includes an in-band pointer to an in-band network location accessible by the managed server over the in-band network, the configuring including the managed server accessing the in-band network location to obtain in-band configuration information, the configuring further including the managed server configuring the managed server based at least in part on the in-band configuration information.

2. The configuration process as recited in claim 1 wherein the pointer is included in the received configuration information.

3. The configuration process as recited in claim 1 wherein the configuring further includes the managed server identifying applicable in-band configuration information by distinguishing inapplicable in-band configuration information that is applicable to other managed servers but not to the managed server, the configuring involving configuring the managed server using the applicable in-band configuration information and not using the inapplicable in-band configuration information.

4. The configuration process as recited in claim 3 wherein the distinguishing involves distinguishing file-name extensions.

5. A configuration process comprising:
   transmitting, by a baseboard management controller (BMC), a network-address request over an out-of-band network to which the BMC is directly connected;
   receiving, by the BMC in response to the network-address request, received configuration information;
   writing, by the BMC to shared memory shared with a managed server, stored configuration information derived from the received configuration information, the managed server being separate from the BMC;
   accessing, by the managed server, the shared memory to read the stored configuration information;
   configuring, by the managed server using the stored configuration information, the managed server to communicate over an in-band network to which the managed server is directly connected and which is separate from the out-of-band network,
   wherein the received configuration information includes an out-of-band network address of an out-of-band network location accessible to the BMC via the out-of-band network; and
   identifying applicable out-of-band configuration information stored at the out-of-band network location by distinguishing, from the applicable out-of-band configuration information, out-of-band configuration that is applicable other managed servers but not to the managed server.

6. The configuration process as recited in claim 5 wherein the distinguishing is based at least in part on file-name extensions of configuration files.

7. A managed server system comprising:
   a shared memory;
   a managed server to access the shared memory and to configure the managed server based on stored configuration stored in the shared memory, the managed server being a physical server, the managed server including an interface to an in-band network; and
   a baseboard management controller (BMC) to
      issue a network-address request, over an out-of-band network separate from the in-band network, for a network address to be assigned to the BMC,
      write, to the shared memory, stored configuration information derived from received configuration information received in response to the network-address request;
   access, in response to receipt of the received configuration information and via the out-of-band network, an out-of-band network location identified by a pointer in the received configuration information; and
   derive the stored configuration information at least in part from out-of-band configuration information obtained from the out-of-band network location.

8. The managed server system as recited in claim 7 wherein the BMC is further to identify applicable out-of-band configuration information by distinguishing inapplicable out-of-band configuration information that is applicable to other managed servers but not applicable to the managed server.

9. The managed server system as recited in claim 7 wherein the BMC is to derive the stored configuration information at least in part from the applicable out-of-band configuration information and not from any of the inapplicable out-of-band configuration information.

* * * * *